United States Patent
Izawa et al.

(10) Patent No.: US 6,477,141 B1
(45) Date of Patent: Nov. 5, 2002

(54) COMMUNICATION PATH QUALITY MONITORING METHOD AND QUALITY MONITORING APPARATUS

(75) Inventors: Naoyuki Izawa; Hiroya Kawasaki; Masaki Kira; Noriko Samejima, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/260,313

(22) Filed: Mar. 2, 1999

(30) Foreign Application Priority Data

May 6, 1998 (JP) ............................................. 10-123034

(51) Int. Cl.[7] ............................................... H04L 12/26
(52) U.S. Cl. ...................... 370/219; 370/250; 370/395.1
(58) Field of Search ................................. 370/219, 220, 370/225, 227, 228, 250, 395.1

(56) References Cited

U.S. PATENT DOCUMENTS

| | | | | |
|---|---|---|---|---|
| 5,671,213 A | * | 9/1997 | Kurano | 370/218 |
| 5,878,063 A | * | 3/1999 | Kawasaki et al. | 370/242 |
| 6,075,767 A | * | 6/2000 | Sakamoto et al. | 370/228 |
| 6,141,326 A | * | 10/2000 | Minami | 370/229 |
| 6,147,972 A | * | 11/2000 | Onishi et al. | 370/241.1 |

FOREIGN PATENT DOCUMENTS

| | | |
|---|---|---|
| JP | 4-291856 | 10/1992 |
| JP | 7-15459 | 1/1995 |
| JP | 7-221767 | 8/1995 |

* cited by examiner

*Primary Examiner*—Melvin Marcelo
(74) *Attorney, Agent, or Firm*—Katten Muchin Zavis Rosenman

(57) ABSTRACT

A start/stop setting section is provided on the upstream side of a dual-configuration ATM switch, and a start/stop detection section is provided on the downstream side for each of a working and a protection line. At the initiation of quality monitoring, the start/stop setting section sets a start bit in an incoming cell having a specified identifier, and thereupon starts counting the number of cells whose identifier matches the specified identifier. The start/stop detection section, upon detecting the cell having the start bit, starts counting the number of cells whose identifier matches the identifier of the detected cell. At the end of the quality monitoring, the start/stop setting section sets a stop bit in an incoming cell having the specified identifier, and thereupon stops the counting of cells.

8 Claims, 4 Drawing Sheets

COMMUNICATION PATH QUALITY MONITORING METHOD AND QUALITY MONITORING APPARATUS

BACKGROUND OF THE INVENTION

1. Field of the Invention

The present invention relates to a communication path quality monitoring method and quality monitoring apparatus, and more particularly to a quality monitoring method and quality monitoring apparatus for monitoring the quality of a communication path passing through a dual-configuration ATM exchange. Generally, an ATM (Asynchronous Transfer Mode) exchange employs a dual configuration for increased reliability. For example, an ATM switch section is constructed in a dual configuration of line 0 and line 1 (working and protection lines), and in the event of a failure of the working line, service is switched to the protection line to provide uninterrupted ATM cell switching operations. In such a case, it is desired to maintain the quality of cell switching so that user cells will not be lost when switching to the protection line is performed.

2. Description of the Related Art

The ATM cell is standardized to 53 bytes in length, with five bytes for the header and 48 bytes for the information field. In a common implementation of an ATM exchange for switching such ATM cells, a routing tag or additional header consisting of one or more bytes is appended to each incoming 53-byte ATM cell and, when output by self-routing, the ATM cell is stripped of the tag or additional header and transmitted out as a 53-byte cell.

As described above, a dual configuration is employed for an ATM exchange for increased reliability. For example, in an ATM exchange having ATM switch sections of line 0 and line 1, if the ATM switch section of line 0 is set as a working (or acting) facility, then the ATM switch section of line 1 is a protection (or standby) facility. Each ATM cell input to a subscriber interface section is delivered simultaneously to the ATM switch sections of line 0 and line 1, and the ATM cell is routed in accordance with the virtual path identifier VPI and virtual channel identifier VCI carried in the header thereof. The ATM cells output from the ATM switch sections of line 0 and line 1 are input to a second subscriber interface section. This subscriber interface section selects the ATM cell from the ATM switch section of line 0 for output, since line 0 is the working facility. If a failure is detected in the ATM switch section of line 0, the subscriber interface section selects the ATM cell from the ATM switch section of line 1 for output. In this way, if a failure occurs in one ATM switch section, cell switching operations can continue without interruption by switching to the other ATM switch section.

In the above-described dual-configuration ATM exchange, when switching operations are being performed using the ATM switch section of line 0 as the working unit, if switching to the ATM switch section of line 1 is performed because of a failure of the working ATM switch section, a minor hardware trouble could result in user cell loss, since the operability of the ATM switch section of line 1 is not verified. Such user cell loss would lead to the degradation of sound or image reproduction quality at the receiving end. Furthermore, in reality it is extremely difficult to locate the user cell loss point in a short time.

SUMMARY OF THE INVENTION

It is an object of the present invention to achieve quality monitoring, including the quality relating to the configuration of the protection facility, by using a simple construction.

According to the present invention, there is provided a communication path quality monitoring method comprising the steps of: setting a start bit in a cell passing a first point and having an identifier of a specified communication path; counting the number of cells passing the first point and having the same identifier as the identifier of the cell in which the start bit has been set; detecting the cell having the start bit, at a second point downstream of the first point; counting, after the detection of the cell having the start bit, the number of cells passing the second point and having the same identifier as the identifier of the cell having the start bit; and evaluating the quality of the communication path by comparing the count values obtained at the first and second points.

According to the present invention, there is also provided a communication path quality monitoring apparatus comprising: a setting device for setting a start bit in a cell passing a first point and having an identifier of a specified communication path; a first counter for counting the number of cells passing the first point and having the same identifier as the identifier of the cell in which the start bit has been set; a detector for detecting the cell having the start bit, at a second point downstream of the first point; a second counter for counting, after the detection of the cell having the start bit, the number of cells passing the second point and having the same identifier as the identifier of the cell having the start bit; and means for evaluating the quality of the communication path by comparing the count values of the first and second counters.

DESCRIPTION OF THE PREFERRED EMBODIMENTS

Figure 1:
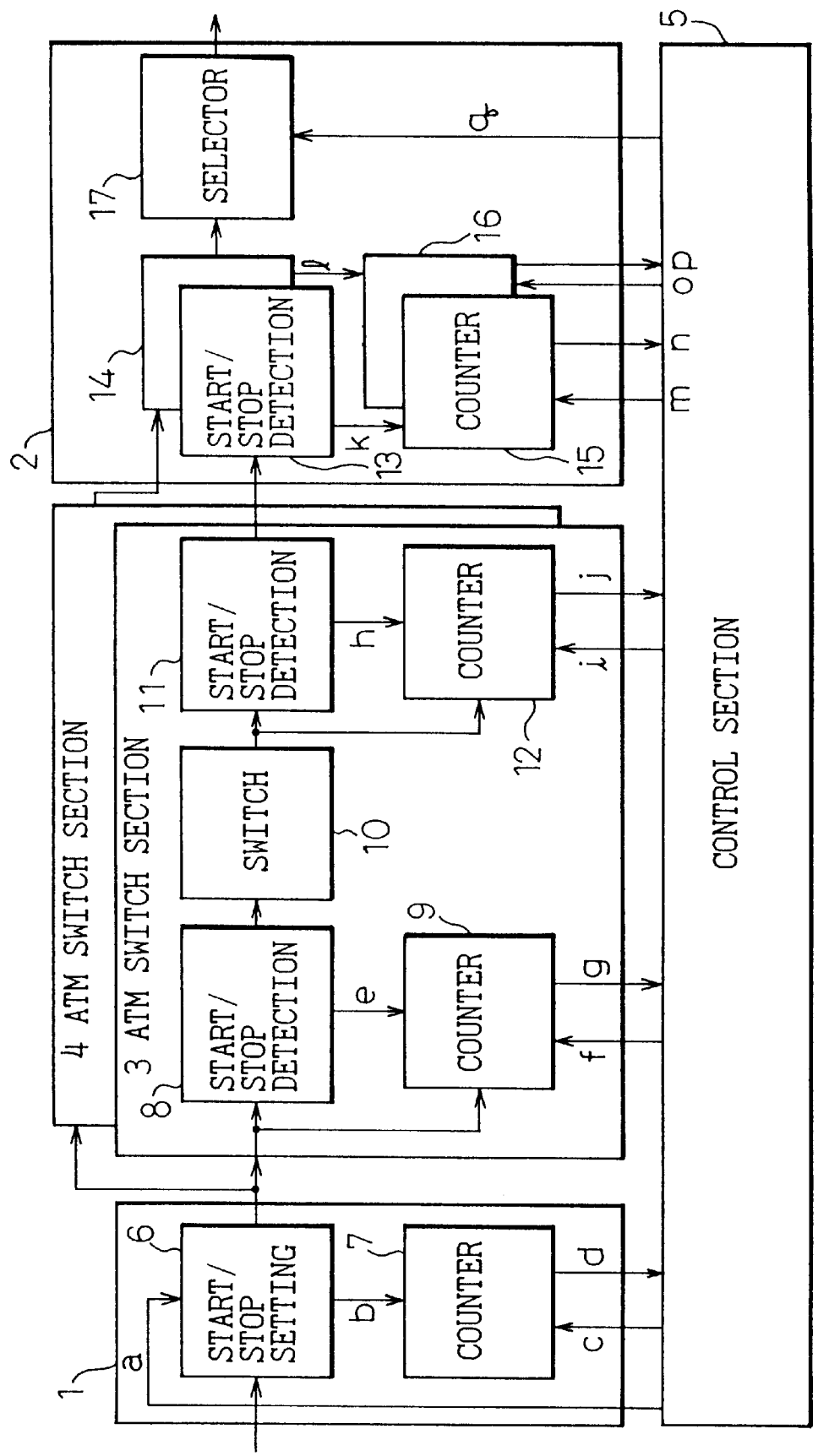
FIG. 1 is a block diagram showing a first embodiment of the present invention.

FIG. 1 is a diagram for explaining a first embodiment of the present invention, in which reference numerals 1 and 2 are subscriber interface sections, 3 and 4 are ATM switch sections of line 0 and line 1, respectively, 5 is a control section, 6 is a start/stop setting section, 7 is a counter, 8, 11, 13, and 14 are start/stop detection sections, 9, 12, 15, and 16 are counters, 10 is a switch, and 17 is a selector. The line-0 and line-1 ATM switch sections 3 and 4 are identical in configuration.

Each ATM cell entering the subscriber interface section 1 has an additional header appended to it by a front-end facility not shown. The ATM cell is delivered from the subscriber interface section 1 to both the line-0 and line-1 ATM switch sections 3 and 4 where the switch 10 performs routing in accordance with the contents of the additional header. Between the thus output ATM cells, the ATM cell output from the line-0 ATM switch section 3 is selected by the selector 17 in the subscriber interface section 2, and is transmitted out as a 53-byte ATM cell after the additional header is removed by a back-end facility not shown.

The start/stop setting section 6 in the subscriber interface section 1, under directions from the control section 5, sets a start bit, indicating the start of quality monitoring, or a stop bit, indicating the end of quality monitoring, in the additional header. The counters 9, 12, 15, and 16 are controlled to start counting ATM cells when the start bit is detected by the respective start/stop detection sections 8, 11, 13, and 14, and stop counting when the stop bit is detected. The counter 7 is controlled from the start/stop setting section 6. The control section 5 monitors the quality of the line-0 and line-1 ATM switch sections 3 and 4 by reading the count values of the counters 7, 9, 12, 15, and 16.

Figure 2:
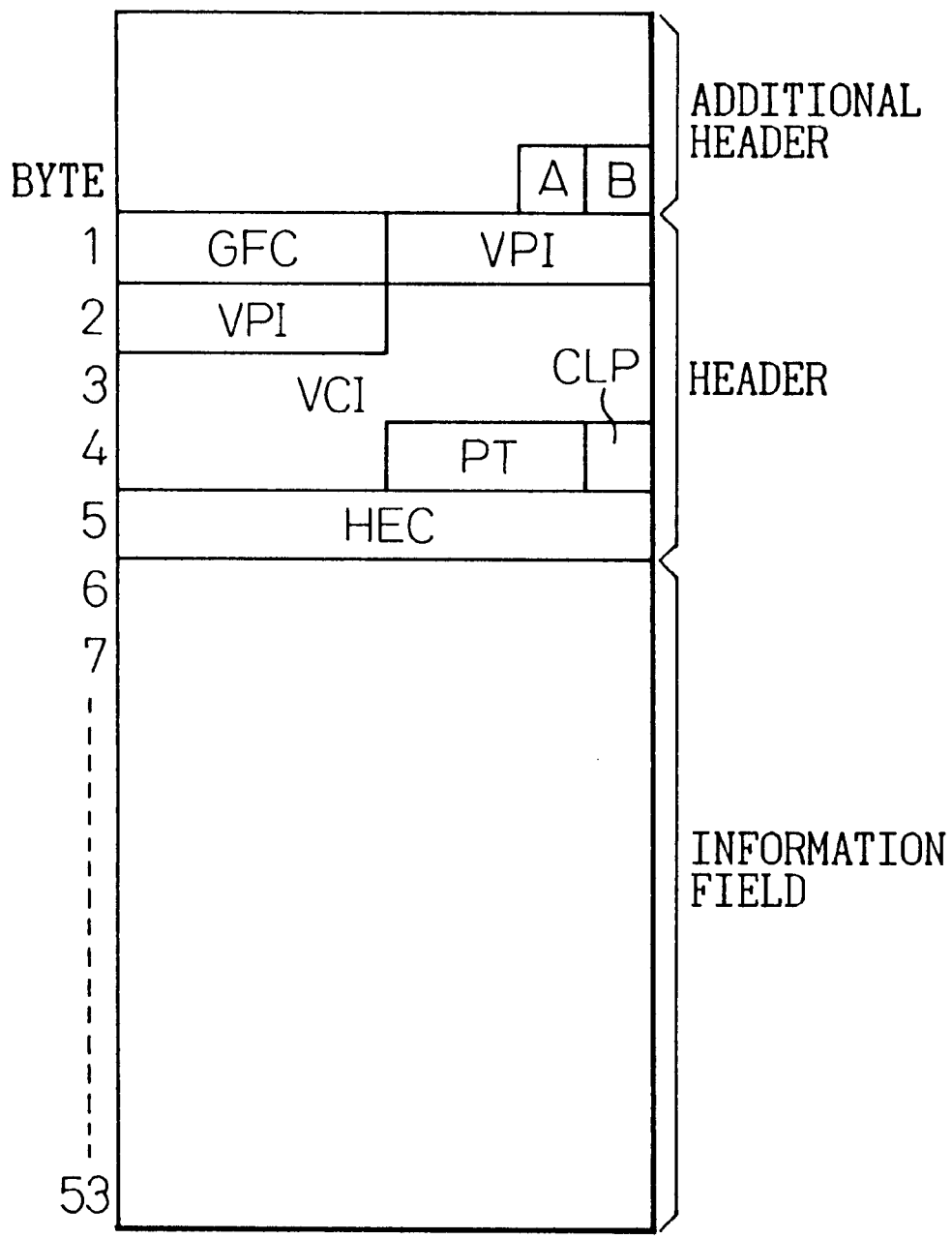
FIG. 2 is a diagram showing the format of an ATM cell transferred within an ATM exchange.

FIG. 2 is a diagram for explaining the format of an ATM cell transferred within an ATM exchange. As earlier described, the standardized ATM cell consists of a 5-byte header and a 48-byte information field. In the header, GFC indicates a Generic Flow Control, VPI a Virtual Path Identifier, VCI a Virtual Channel Identifier, PT a Payload Type, CLP a Cell Loss Priority indicator, and HEC is a Header Error Control. FIG. 2 shows the format of the ATM cell at the User Network Interface. For the Network Node Interface, the bits used for the above GFC field are used as high-order bits of the VPI field.

The additional header can be constructed from one or several bytes, in which two bits, for example, A and B, can be assigned to the start bit and stop bit, respectively. For example, the start bit in the additional header of the first ATM cell with which quality monitoring is to be started is set active (logical 1) and, when the quality monitoring is to be ended after a prescribed time, the stop bit B in the additional header is set active (logical 1). The start bit A and stop bit B may be placed at other positions in the additional header, or may be used in other ways. For example, control may be performed in such a way that when A=1, B=1 is used as a start bit and B=0 as a stop bit, and when A=0, bit B is ignored.

In FIG. 1, control information a directing the initiation of quality monitoring is applied from the control section 5 to the start/stop setting section 6 in the subscriber interface section 1. At this time, the path (VPI/VCI) to be monitored for quality is specified. The start/stop setting section 6 extracts VPI/VCI from the header of an incoming ATM cell and, if the ATM cell has the specified VPI/VCI, sets the start bit A (see FIG. 2) in the additional header of the ATM cell active (logical 1) and applies signal b to the counter 7, thus causing the counter 7 to start counting ATM cells, while, at the same time, setting a flag (not shown) active (logical 1) indicating the transmission of the ATM cell in which the start bit A has been set.

The ATM cell with its start bit A set active (logical 1) is input to both the line-0 and line-1 ATM switch sections 3 and 4, and when the ATM cell with its start bit A set active (logical 1) is detected by the start/stop detection section 8 at the input side and the start/stop detection section 11 at the output side, the VPI/VCI of that ATM cell is held therein and signals e and h are applied to the respective counters 9 and 12, causing the counters 9 and 12 to start counting. Thereafter, the counters 9 and 12 count up each time an ATM cell having the same VPI/VCI as the thus held VPI/VCI is recognized.

For the ATM cells entering the subscriber interface section 2 from the line-0 and line-1 ATM switch sections 3 and 4, when the ATM cell with its start bit A set active (logical 1) is detected by the start/stop detection sections 13 and 14, signals k and l are applied to the respective counters 15 and 16, thus causing the counters 15 and 16 to start counting and to count up with each ATM cell having the same VPI/VCI as the cells counted by the counters 9 and 12.

The control section 5 thereafter applies information a directing the end of the quality monitoring to the start/stop setting section 6, whereupon when an ATM cell is input that matches the currently held VPI/VCI, the start/stop setting section 6 sets the stop bit B in its additional header active (logical 1) and applies signal b to the counter 7, thereby causing the counter 7 to stop the counting action, while, at the same time, setting a flag (not shown) active (logical 1) indicating the transmission of the ATM cell in which the stop bit B has been set.

When the ATM cell with its stop bit B set active (logical 1) is detected by the respective start/stop detection sections 8, 11, 13, and 14, signals e, h, k, and l are applied to the respective counters 9, 12, 15, and 16, causing them to stop the counting action. The control section 5 checks the start bit set flag and stop bit set flag in the subscriber interface section 1, applies signals c, f, i, m, and o to the counters 7, 9, 12, 15, and 16, respectively, and reads count values d, g, j, n, and p. Thus the counters 7, 9, 12, 15, and 16 are reset while also resetting the flags.

Then the control section 5 compares the count values d, g, j, n, and p of the counters 7, 9, 12, 15, and 16; if the values are the same, it can be determined that the quality of line 0 and line 1 is normal. In that case, the quality as the ATM exchange will not be affected if line 0 and line 1 are interchanged. If the values do not match, the failed point can be located by analyzing the values.

Figure 3:
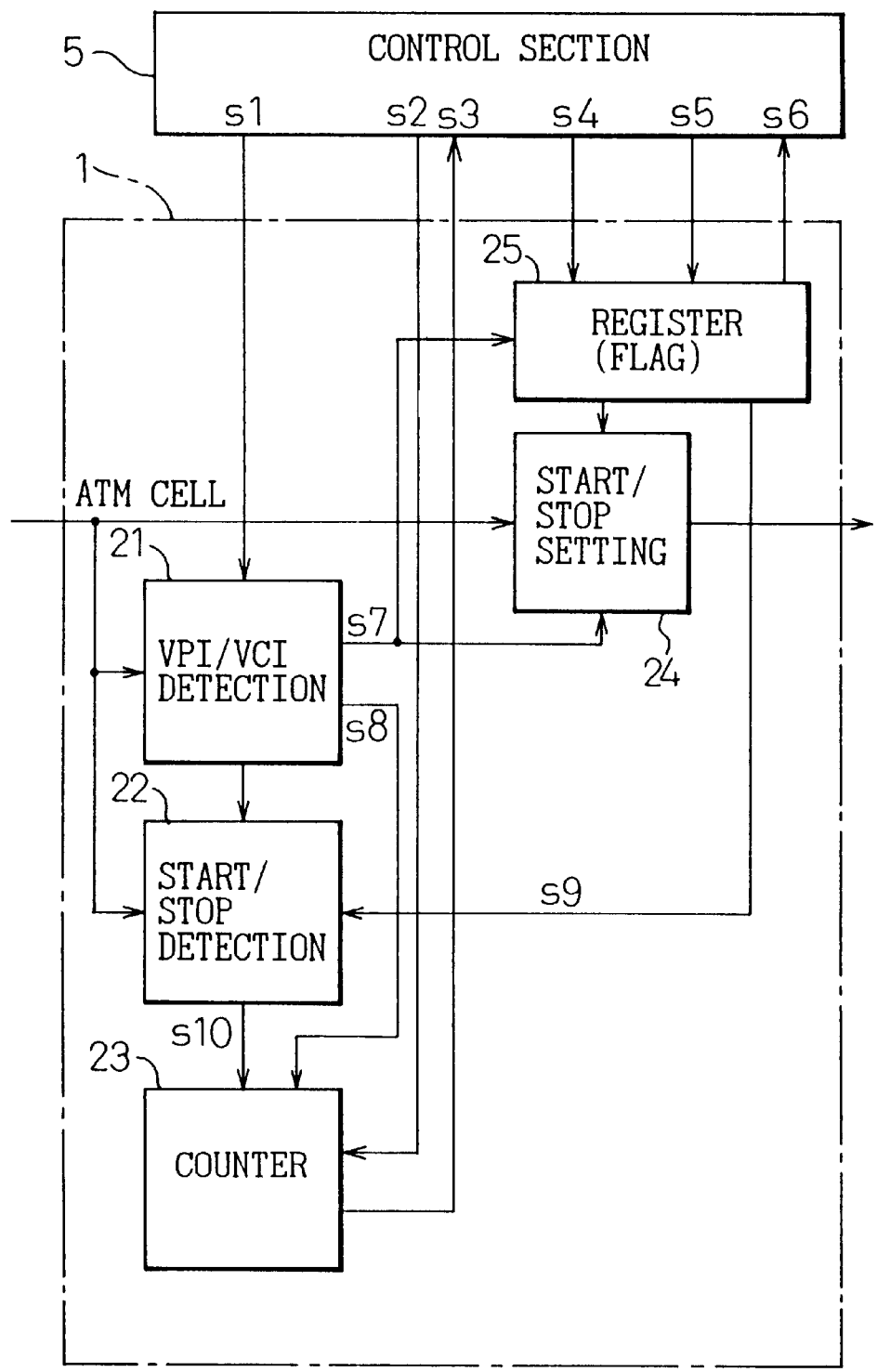
FIGS. 3 and 4 are block diagrams showing a second embodiment of the present invention.
Figure 4:
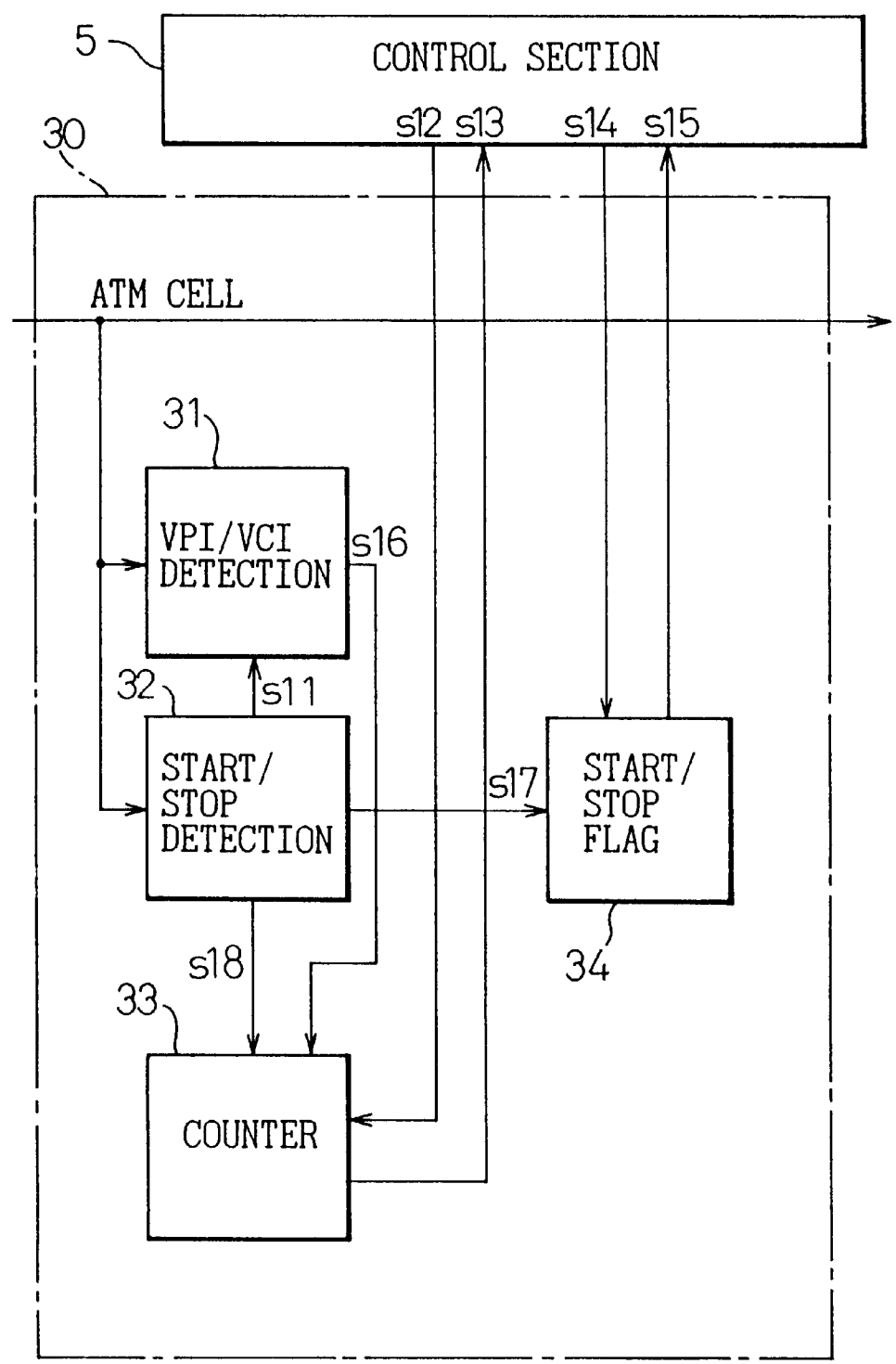

FIGS. 3 and 4 are diagrams for explaining the essential portions of a second embodiment of the present invention. FIG. 3 shows the subscriber interface section 1 and control section 5 at the front end of the ATM switch section; in the subscriber interface section 1, reference numeral 21 is a VPI/VCI detection section, 22 is a start/stop detection section, 23 is a counter, 24 is a start/stop setting section, and 25 is a register for flag setting, etc.

In FIG. 4, the essential portions corresponding to the control circuitry for the counters 9, 12, 15, and 16 at the input and output sides of the ATM switch sections 3 and 4 or in the subscriber interface section 2 are generally indicated by reference numeral 30, wherein 31 is a VPI/VCI detection section, 32 is a start/stop detection section, 33 is a counter, and 34 is a start/stop flag.

The VPI/VCI detection section 21 in the subscriber interface section 1 detects ATM cells that have virtual path and virtual channel identifiers (VPI/VCI) that match the path specified by signal s1 from the control section 5. When detection signal s11 from the start/stop detection section 32 indicates the detection of a start bit, the VPI/VCI detection section 31 stores the VPI/VCI of the ATM cell having the detected start bit, and thereafter detects ATM cells that match the stored VPI/VCI. When the detection signal s11 indicates the detection of a stop bit, the VPI/VCI detection section 31 clears the stored VPI/VCI. The counters 23 and 33 start counting detection signals s8 and s16 from the respective start/stop detection sections 22 and 32 when detection signals s10 and s18 from the respective start/stop detection sections 22 and 32 indicate the detection of the start bit, and stop counting when these detection signals indicate the detection of the stop bit.

The start/stop setting section 24, by a start instruction given from the control section 5 via the register 25, set active (logical 1) the start bit A (see FIG. 2) in the additional header of an ATM cell that activates the detection signal s7 from the VPI/VCI detection section 21 and, by a stop instruction given from the control section 5 via the register 25, set active (logical 1) the stop bit B (see FIG. 2) in the additional header of an ATM cell that activates the detection signal s7 from the VPI/VCI detection section 21.

When starting the quality monitoring operation, the VPI/VCI of the path to be monitored is specified by the signal s1 from the control section 5, whereupon the VPI/VCI detection section 21 starts monitoring the VPI/VCI in the header of each incoming ATM cell. When start instruction signal s4 is applied from the control section 5 to the register 25, the register 25 in response applies a start bit A setting instruction signal to the start/stop setting section 24, and also applies a start bit detection indicating signal s9 to the start/stop detection section 22 which, in response, applies signal s10 to the counter 23 which is thus enabled.

When an ATM cell having the VPI/VCI of the specified path is detected, the VPI/VCI detection section 21 applies the detection signal s7 to the start/stop setting section 24 and register 25 and the detection signal s8 to the counter 23. Since it is enabled, the counter 23 counts up with the detection signal s8 indicating the detection of the VPI/VCI of the specified path.

The start/stop setting section 24 sets active (logical 1) the start bit A (see FIG. 2) in the additional header of an ATM cell that activates the detection signal s7, and the start bit flag in the register 25 is set active (logical 1).

The start/stop detection section 32 monitors the additional header of each incoming ATM cell for detection of an active (logical 1) start bit A or stop bit B. When the ATM cell with its start bit set active (logical 1) is input, as described above, the start/stop detection section 32 detects the start bit and applies the resultant detection signal s11 to the VPI/VCI detection section 31. The VPI/VCI detection section 31 stores the VPI/VCI carried in the header of that ATM cell. The start/stop detection section 32 applies the detection signal s18 to the counter 33, causing it to start counting, and the detection signal s17 to the start/stop flag 34 to set the start flag active (logical 1).

Thereafter, the counter 33 counts up each time the detection signal s16 is applied from the VPI/VCI detection section 31. Accordingly, if this counter 33 is the counter 9 in FIG. 1, the counter counts the number of ATM cells at the input side of the ATM switch section 3 or 4, and if it is the counter 12, the counter counts the number of ATM cells at the output side of the ATM switch section 3 or 4. If it is the counter 15 or 16 in the subscriber interface section 2, the counter counts the number of ATM cells being sent out from the subscriber interface section 2.

When, after a prescribed time, a stop instruction signal s4 is applied from the control section 5 to the register 25, a stop bit B setting signal is applied from the register 25 to the start/stop setting section 24. Then, when the detection signal s7 from the VPI/VCI detection section 21 is applied to the start/stop setting section 24 and register 25, the start/stop setting section 24 sets the stop bit B in the additional header of the currently input ATM cell active (logical 1), sets the stop bit flag in the register 25 active (logical 1), and applies a stop bit detection indicating signal s9 to the start/stop detection section 22 which, in response, outputs signal s10 to stop the counting action of the counter 23.

When the ATM cell with its stop bit set active (logical 1) is input and detected in the start/stop detection section 32, the start/stop detection section 32 applies a counting action stop signal s18 to the counter 33, and also applies a signal s17 for setting the stop flag active (logical 1) to the start/stop flag 34.

The control section applies signal s5 to the register 25 to read the start flag and stop flag as signal s6, and also applies signal s14 to the start/stop flag 34 to read the start flag and stop flag as signal s15. When the start flag and stop flag are both active (logical 1), it is determined that the quality monitoring control has ended, and the control section 5 applies signals s2 and s12 to the respective counters 23 and 33 and reads their count values as signals s3 and s13, respectively.

When all the counter values are the same, it can be determined that both the working and protection lines have the normal quality. If the count values do not match, that means the occurrence of cell loss, and the path where the cell loss has occurred can be identified. It is then determined whether the amount of cell loss exceeds an allowable value, and if it exceeds the allowable value, maintenance work involving the replacement of units, etc. will be performed before a major failure results. In this way, the quality of the protection line can also be monitored, thereby assuring the quality of ATM switching when service is switched from the working to the protection line.

If cell loss occurs on either the working or protection line and the ATM cell with its start bit A set active (logical 1) does not appear at the output side, the count value of the counter at the output side of the affected line is zero. In that case, since the start flag at the output end is not set active, the quality monitoring control is retried.

Likewise, if cell loss occurs on either the working or protection line and the ATM cell with its stop bit B set active (logical 1) does not appear at the output side, the count value of the counter at the output side of the affected line becomes very large. That is, the number of passing ATM cells greatly differs between the working line and the protection line. However, since the stop flag is not set active, it can be determined that an operational error has occurred, and the quality monitoring control is retried accordingly.

On the other hand, if ATM cells having the VPI/VCI of the specified path do not flow at all, the ATM cell with its start bit set active cannot be passed, nor can the ATM cell with its stop bit set active be passed; as a result, the count value is zero at the working side as well as at the protection side. In that case, since the start flag or stop flag at the output side of the working line and the protection line do not go active, it can be easily determined that the situation is different from that of quality degradation.

The quality monitoring method of the present invention is applicable not only to test cells which are deliberately passed for test purposes, but also to user cells during service operation. When performing quality monitoring of user cells in accordance with a predetermined schedule with prespecified start/stop times, there can occur cases where the stop bit does not go active at the specified time because there happens to be no cell flow that should carry the stop bit. In such cases, even if there is no cell loss, discrepancies may occur between the count values of the counters 7, 9, 12, 15, and 16 (see FIG. 1) because of the intranode propagation delay of ATM cells, making a correct evaluation of quality impossible. However, by making it a condition that the evaluation be performed only when the stop bit is set active, as described above, a correct evaluation becomes possible since the number of ATM cells passing the input side becomes equal to the number of ATM cells passing the output side when there is no cell loss. Alternatively, if the stop bit active condition is not considered, a correct evaluation can be performed by reading the count values starting from the counter at the upstream end in accordance with ATM cell flow speed.

As previously described, the dumping of the counter count values and start and stop flags by the control section 5 can be accomplished by a hardware function or software function of the control section 5. Furthermore, if the counters 7, 9, 12, 15, 16, 23, and 33 are each constructed from a memory and configured to perform counting operations in time division fashion using a plurality of memory areas, it is possible to specify a plurality of paths and count the number of passing ATM cells for each path. In that case, the VPI/VCI detection sections 21 and 31 send the detected VPI/VCI information as notification to the counters 23 and 33, respectively. With this notification, the counters 23 and 33 count up the respective counters in the memory areas associated with the VPI/VCI. That is, not only can the quality of a single path be monitored, but a plurality of paths can also be monitored simultaneously or with a time difference.

As described above, the present invention is able to monitor quality as to whether cell loss has occurred or not, by counting the number of ATM cells passing through the working line (line 0) and protection line (line 1) at both the input and output sides of the dual-configuration ATM exchange. In that case, by setting the start bit A and stop bit B in the additional headers of ATM cells, the quality monitoring period can be set and the quality of both the working and protection lines can be monitored at the same time. This offers the advantage of being able to reduce the number of bits used in the additional header and simplifying quality monitoring operations, compared with the case that requires appending sequential numbers to obtain the number of passing ATM cells. Another advantage is the ease of path-by-path quality monitoring using VPI/VCI, which serves to further enhance the reliability of the dual-configuration ATM exchange.

What is claimed is:

1. A communication path quality monitoring method comprising the steps of:
   (a) setting a start bit in a cell passing a first point and having an identifier of a specified communication path;
   (b) counting the number of cells passing the first point and having the same identifier as the identifier of the cell in which the start bit has been set;
   (c) detecting the cell having the start bit, at a second point downstream of the first point;
   (d) counting, after the detection of the cell having the start bit, the number of cells passing the second point and having the same identifier as the identifier of the cell having the start bit; and
   (e) evaluating the quality of the communication path by comparing the count values obtained at the first and second points.

2. A method according to claim 1, further comprising the steps of:
   (f) setting, at the first point, a stop bit in a cell passing the first point and having the identifier of the specified communication path, and thereupon stopping the counting of cells; and
   (g) stopping the counting of cells when the cell having the stop bit is detected at the second point, and wherein:
   in step (c), the evaluation of the communication path quality is performed only when the cell having the stop bit is detected at the second point.

3. A method according to claim 1, wherein
   the communication path passes through a first switching machine and a second switching machine which are arranged in a dual configuration,
   the first point is located upstream of the first and second switching machines, and
   the second point includes two measuring points respectively located downstream of the first and second switching machines and at the front end of a selector which selects one of the first and second switching machines, wherein the detection and counting of cells is performed at each of the measuring points.

4. A method according to claim 3, wherein the second point further includes four measuring points respectively located at the front and back ends of the first and second switching machines, and the detection and counting of cells is performed at each of the measuring points.

5. A communication path quality monitoring apparatus comprising:
   a setting device for setting a start bit in a cell passing a first point and having an identifier of a specified communication path;
   a first counter for counting the number of cells passing the first point and having the same identifier as the identifier of the cell in which the start bit has been set;
   a detector for detecting the cell having the start bit, at a second point downstream of the first point;
   a second counter for counting, after the detection of the cell having the start bit, the number of cells passing the second point and having the same identifier as the identifier of the cell having the start bit; and
   means for evaluating the quality of the communication path by comparing the count values of the first and second counters.

6. An apparatus according to claim 5, wherein
   the setting device sets a stop bit in a cell passing the first point and having the identifier of the specified communication path, and stops the first counter,
   the detector stops the second counter upon detecting the cell having the stop bit, and
   the evaluation means performs the evaluation of the communication path quality only when the cell having the stop bit is detected.

7. An apparatus according to claim 5, wherein
   the communication path passes through a first switching machine and a second switching machine which are arranged in a dual configuration,
   the first point is located upstream of the first and second switching machines, and
   the second point includes two measuring points respectively located downstream of the first and second switching machines and at the front end of a selector which selects one of the first and second switching machines, wherein the detector and counter are provided at each of the measuring points.

8. An apparatus according to claim 7, wherein the second point further includes four measuring points respectively located at the front and back ends of the first and second switching machines, and the detector and counter are provided at each of the measuring points.

* * * * *